March 25, 1930.  W. OWEN  1,751,712
GLASS HANDLING APPARATUS
Filed June 25, 1928   4 Sheets-Sheet 1

INVENTOR
Wm Owen
by
J. C. Bradley
atty

March 25, 1930.  W. OWEN  1,751,712
GLASS HANDLING APPARATUS
Filed June 25, 1928  4 Sheets-Sheet 3

INVENTOR
Wm Owen
by
James E Bradley
atty

March 25, 1930.  W. OWEN  1,751,712
GLASS HANDLING APPARATUS
Filed June 25, 1928   4 Sheets-Sheet 4

INVENTOR
Wm Owen
by
James C Bradley
Atty

Patented Mar. 25, 1930

1,751,712

UNITED STATES PATENT OFFICE

WILLIAM OWEN, OF PITTSBURGH, PENNSYLVANIA, ASSIGNOR TO PITTSBURGH PLATE GLASS COMPANY, A CORPORATION OF PENNSYLVANIA

GLASS-HANDLING APPARATUS

Application filed June 25, 1928. Serial No. 288,123.

Figure 1:
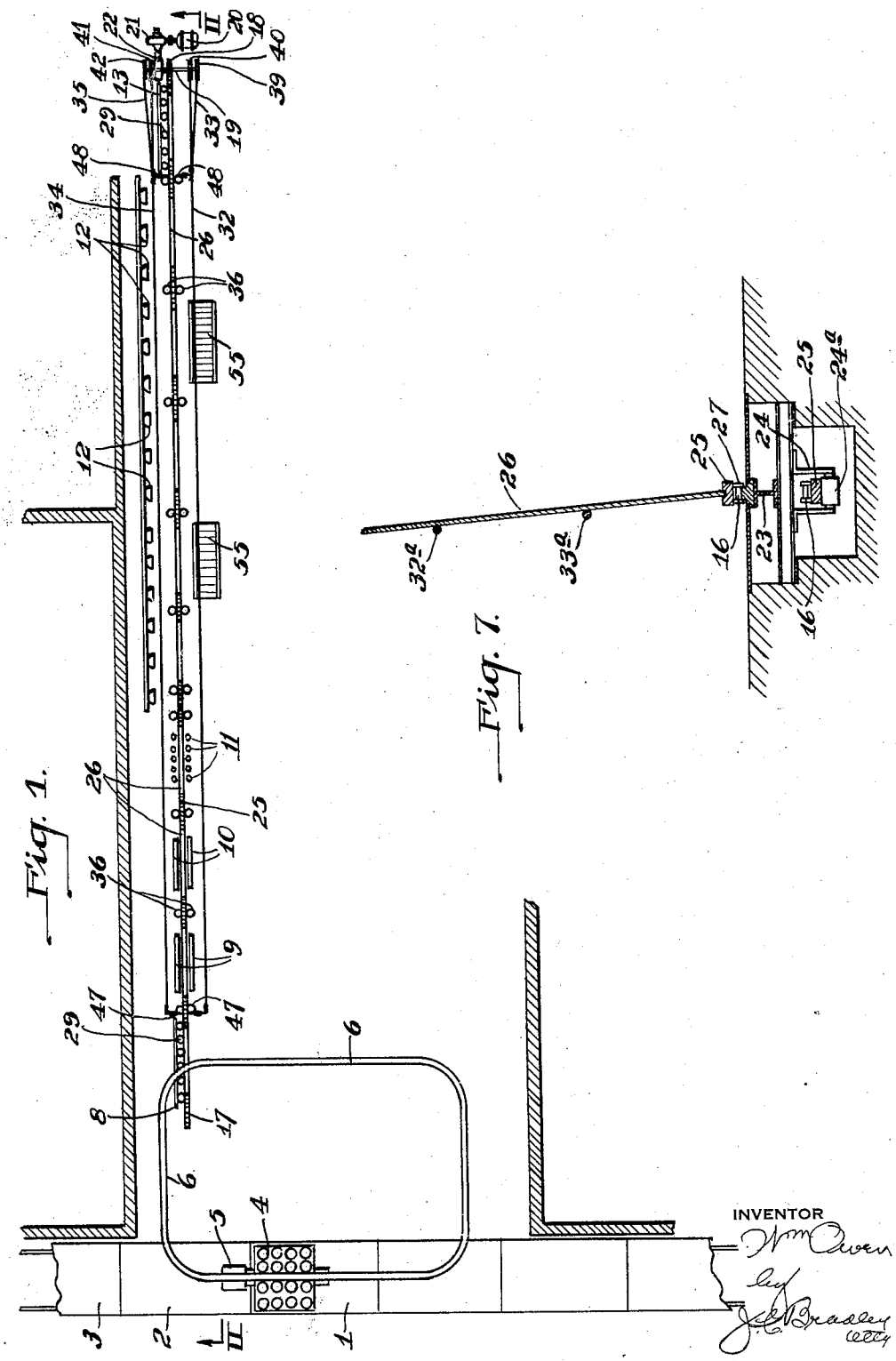
Figure 2:
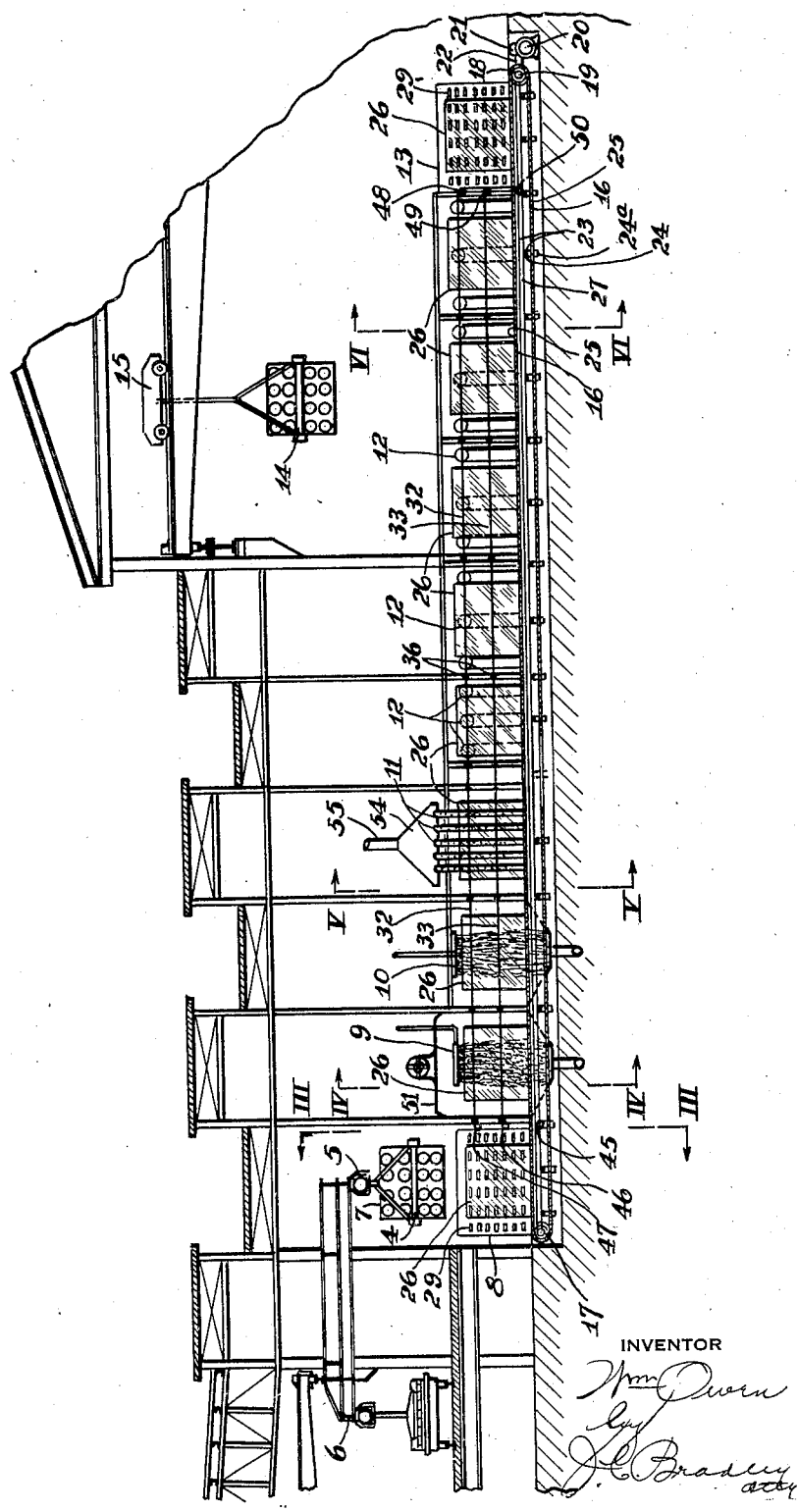

The invention relates to apparatus for handling glass sheets, and particularly sheets of plate glass after the polishing operation and during the steps of cleaning and inspecting, the first of which operations requires a treatment of the glass with a weak acid solution to remove the plaster adhering to it, the washing off of the acid water and the drying of the plate. The invention has for its principal objects, the provision of improved apparatus in which the work of handling is reduced to a minimum; which is of relatively cheap, simple construction; which can be operated rapidly and imposes no strain upon the glass tending to break it; and which offers substantially no interference to the cleaning of the glass or to its inspection for defects after the glass has been cleaned and dried. One embodiment of the invention is illustrated in accompanying drawings, wherein:

Fig. 1 is a plan view, somewhat diagrammatic in character. Fig. 2 is a vertical section on the line II—II of Fig. 1, also somewhat diagrammatic in character. Figs. 3, 4, 5 and 6 are enlarged sections taken on the lines III—III, IV—IV, V—V, and VI—VI, respectively of Fig. 2. And Fig. 7 is a section through a modification.

The glass sheets, which are to be cleaned and inspected, are carried upon the beds of the cars 1, 2, 3, etc. (Fig. 1) on which cars the glass has been ground and polished. The sheets are set in plaster, so that after the sheet is loosened, the lower side holds enough of the plaster to discolor it, thus requiring the application of the weak acid solution, as later described. The glass sheets are lifted from the cars by means of a vacuum frame 4, supported on the crane 5, the crane 5 in turn riding upon the endless track 6. The glass sheet 7 to be cleaned is carried by the vacuum frame to a position over the receiving table or rack 8, as indicated in Fig. 2, after which it is lowered onto the rack (Fig. 3) and transferred by a continuous conveying system to the right. In such movement to the right, it successively passes, first, the spray pipes 9, which provide a flow of dilute acid over the sheet to remove the plaster, second, the rinsing pipes 10, which wash away the acid water, third, the heating pipes 11, which supply hot air under pressure against the surfaces of the sheet to dry it, and fourth, the inspection devices, including the series of lights 12 (Fig. 1) located on the far side of the glass from the inspectors, who mark the defects noted in the glass with chalk. The sheets thus cleaned and inspected pass onto another receiving rack or table 13, similar in all respects to the table 8 from which the sheets are moved to the cutting tables, by means of the vacuum frame 14 carried by the crane 15 (Fig. 2).

The sheets are moved along the path above described by an endless conveyor chain 16 lying in a vertical plane and passing at one end around the idler sprocket 17 beneath the rack 8 and at the other end around the driving sprocket 18. The driving sprocket 18 is keyed to a shaft 19 driven from the motor 20 (Fig. 1) through the intermediary of suitable worm gearing in the casings 21 and 22. The upper and lower flights of the conveyor chain are supported respectively on the I beams 23 and brackets 24, as indicated in Figs. 3 to 6, the chain being provided with grooved rubber shoes 25 to receive the edges of the glass sheets 26, 26, 26, etc. The I beams 23 carry a track 27 having an upstanding central flange which fits between the side plates of the chain and engages suitable rollers carried by the pintles of the links, this being a well-known conveyor chain construction. The brackets 24 are provided at intervals with the rollers 24ª (Fig. 4).

Figure 3:
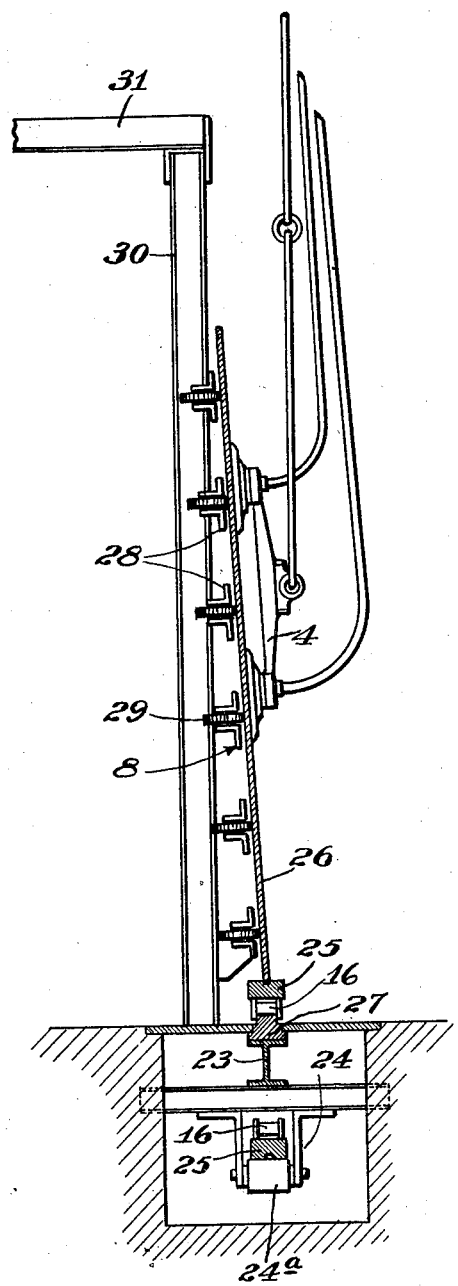
Figure 4:
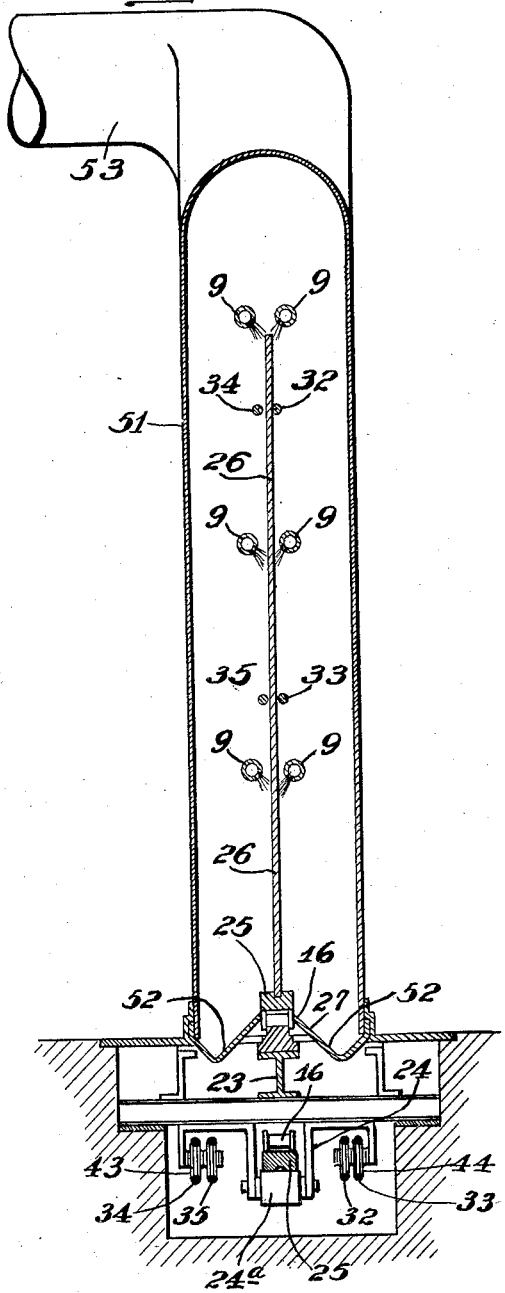
Figure 5:
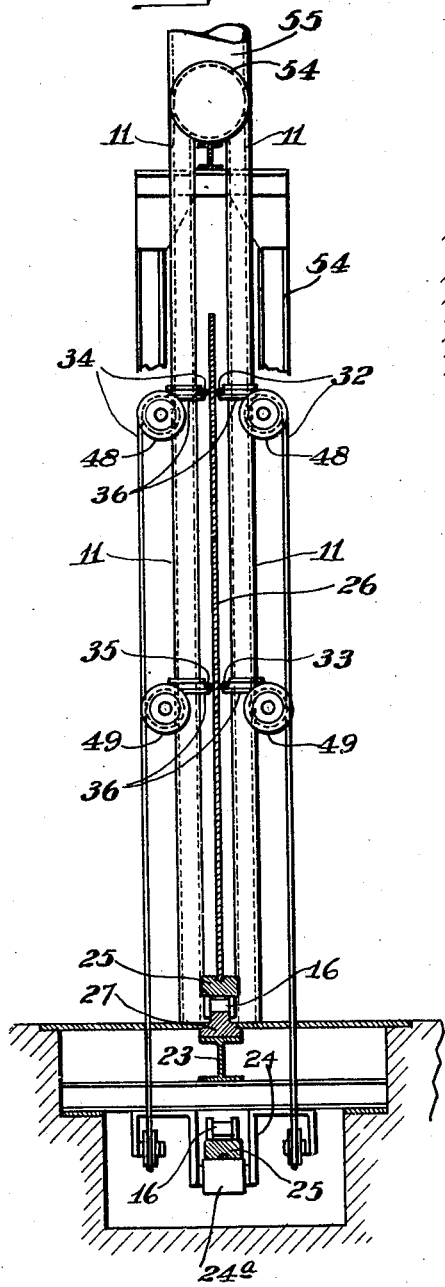

The receiving tables or racks 8 and 13 are mounted above the ends of the conveyor chain, and each comprises the structure as shown in Fig. 3. The racks are made up of a series of angles 28 secured together and provided with the rollers 29. The rack frame is slightly inclined from the vertical, and is carried by the supports 30 and 31. When a glass sheet is positioned on this rack it will be maintained by gravity in upright position as it is carried along by the conveyor chain 16, the rollers 29 reducing the frictional resistance of the rack to the longitudinal movement of the glass. This form of rack or table, being open on one side, permits of the convenient use of the vacuum frame, both in the positioning of the glass sheets on the table 8 and in their removal from the table 13.

The glass sheets are supported in vertical position upon the conveyor chain 16 in their movement from the table 8 to the table 13 by two sets of endless cables 32 and 33 and 34 and 35. These cables are driven from the motor 20 which drives the conveyor chain 16, and move at the same rate of speed as such chain, so that there is no tendency to mark the polished surfaces of the glass sheets. They preferably consist of woven metal centers to promote flexibility covered with a rubber sheath to protect the metal from the action of the acid water and prevent any scratching of the glass. The cables are guided intermediate their ends and are prevented from sagging by a suitable number of rollers 36 carried by the vertical supports 37 (Fig. 6) braced by the members 38. The cables are driven from the pulleys 39, 40, 41 and 42 carried by the shaft 19 upon which the sprocket 18 is carried for driving the conveyor chain 16, as heretofore described. The bottom flight of each of the cables passes to the end of the apparatus remote from the drive pulleys 39, 40, 41 and 42 supported on the series of rollers 43 and 44, (Fig. 4). They then pass up around the pulleys 45, 46 and 47 (Fig. 2) and return to the right hand end of the apparatus guided and supported by the pulleys 36 heretofore referred to. Arriving at the end of the rack or table 13, the cables pass around the pulleys 48, 49 and 50 and back to the drive pulleys on the shaft 19.

In their movements from the table 8 to the table 13, the glass plates pass first into the hood 51, shown in section on Fig. 4, where the plates are treated with a dilute hydrochloric acid solution to remove the discoloration due to the plaster, the acid being sprayed from the series of pipes 9. The acid water, which drains from the glass, is collected in the troughs 52 and returned to a supply tank for reuse by suitable piping and pumping means. The hood is provided with a suitable exhaust pipe 53 connected with a fan for conducting the acid fumes away. The glass plates are next carried past the pipes 10 from which rinse water is sprayed over the surface of the glass, and this is followed by a drying action, as the plates are carried past the series of perforated pipes 11 through which hot air under pressure is supplied, the pipes being connected to a header 54 connected to a hot air supply pipe 55.

Figure 6:
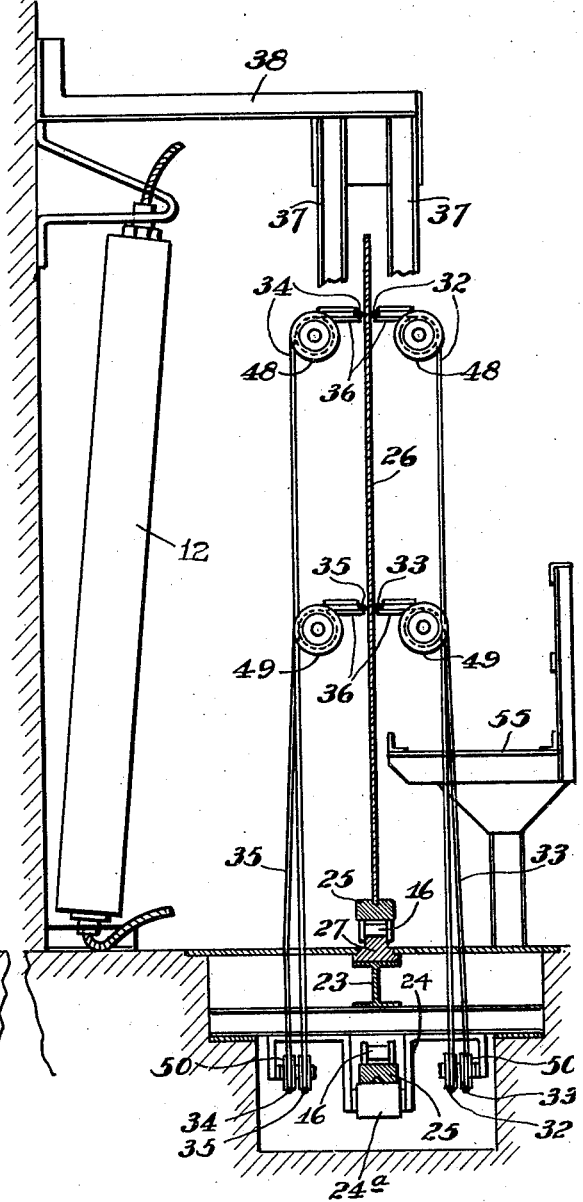

The glass is now in condition for inspection, and this is done by operators placed along the line of travel of the glass between the drying apparatus and the removing rack or table 13. To facilitate this inspection, the lamps 12, preferably of the Cooper-Hewitt type, are provided, as indicated in Figs. 1 and 6. In the inspection of large sheets of glass, inspectors may be employed at two different levels, the bench 55 (Fig. 6) being provided extending along the line of travel of the glass, upon which the inspectors stand for examining the upper portions of the sheets.

Fig. 7 illustrates a modification in which the cables on one side of the sheets are done away with, and only the two cables 32ª and 33ª are employed for supporting the sheet as it is moved along by the conveyor chain 16. In this construction, the sheet must be inclined to prevent it tilting to the right. This arrangement has the advantage of simplicity, but the glass cannot be inspected to quite the same advantage as is the case where the glass is supported by the two sets of cables in a vertical position.

The use of the cables for supporting the glass is particularly advantageous in a cleaning and inspection system, as the area of the glass sheets shielded from contact with the acid solution is reduced to a minimum, and the relatively thin cable offers little obstruction of vision in the examining operation.

What I claim is:

1. In apparatus for handling sheets of glass, an endless carrier having a horizontal flight provided with means for supporting the lower edges of a series of upright glass sheets, an endless supporting cable having a horizontal flight extending longitudinally of the line of travel of the sheets above the lower edge thereof and engaging the faces of the sheets, and means for driving the carrier and the cable.

2. In apparatus for handling sheets of glass, an endless carrier having a horizontal flight provided with means for supporting the lower edges of a series of upright glass sheets, an endless supporting cable having a horizontal flight extending longitudinally of the line of travel of the sheets above the lower edge therof and engaging the faces of the sheets, an inclined receiving table at one end of the apparatus above said flight of the endless carrier so that the sheets which are placed against the table flatwise are supported on the carrier, and means for driving the carrier and the cable.

3. In apparatus for handling sheets of glass, an endless carrier having a horizontal flight provided with means for supporting the lower edges of a series of upright glass sheets, an endless supporting cable having a horizontal flight extending longitudinally of the line of travel of the sheets above the lower edge thereof and engaging the faces of the sheets, an inclined receiving table at each end of the apparatus above said flight of the endless carrier, so that sheets engaging the tables flatwise are supported and moved along by the carrier, and means for driving the carrier and the cable.

4. In apparatus for handling sheets of glass, an endless carrier having a horizontal flight provided with means for supporting the lower edges of a series of upright glass sheets, an endless supporting cable for each side of the sheet, each provided with a flight lying above the carrier and extending longitudinally of the line of travel of the sheets, and means for driving the carrier and the cables, said cables being adapted to engage the faces of the sheets and hold them in upright position.

5. In apparatus for handling sheets of glass, an endless carrier having a horizontal flight provided with means for supporting the lower edges of a series of upright glass sheets, an endless supporting cable for each side of the sheet each provided with a flight lying above the carrier and extending longitudinally of the line of travel of the sheets, a receiving table inclined slightly to the vertical at the entrance end of the apparatus adapted to guide the sheets placed thereon between said cables, and means for driving the carrier and cables, said cables being adapted to prevent the sheets from tilting substantially from their upright positions.

6. In apparatus for handling sheets of glass, an endless carrier having a horizontal flight provided with means for supporting the lower edges of a series of upright glass sheets, an endless supporting cable for each side of the sheet, each provided with a flight lying above the carrier and extending longitudinally of the line of travel of the sheets, a receiving table inclined slightly to the vertical at the rear end of the apparatus positioned so as to receive and support the glass delivered thereto by the carrier and the cables, and driving means for said carrier and cables.

In testimony whereof, I have hereunto subscribed my name this 20th day of June, 1928.

WILLIAM OWEN.